(12) United States Patent
Weaver

(10) Patent No.: US 8,585,845 B2
(45) Date of Patent: Nov. 19, 2013

(54) TIRE-FORMING APPARATUS AND RELATED METHODS

(75) Inventor: Douglas Raymond Weaver, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 213 days.

(21) Appl. No.: 12/943,599

(22) Filed: Nov. 10, 2010

(65) Prior Publication Data

US 2012/0111481 A1    May 10, 2012

(51) Int. Cl.
*B29D 30/32*    (2006.01)
*B29D 30/36*    (2006.01)
*B29D 30/24*    (2006.01)

(52) U.S. Cl.
USPC ............ 156/132; 156/402; 156/414; 156/415

(58) Field of Classification Search
USPC ......... 156/132, 133, 398, 400, 402, 414, 415, 156/416, 417; 425/31
See application file for complete search history.

(56) References Cited

U.S. PATENT DOCUMENTS

| | | | | |
|---|---|---|---|---|
| 3,612,225 | A * | 10/1971 | Evans | 188/72.6 |
| 3,864,189 | A * | 2/1975 | Galleithner et al. | 156/415 |
| 3,867,231 | A * | 2/1975 | Casey | 156/415 |
| 3,887,423 | A * | 6/1975 | Gazuit | 156/402 |
| 3,971,694 | A * | 7/1976 | Gazuit | 156/415 |
| 4,131,500 | A | 12/1978 | Wilde et al. | |
| 4,229,246 | A | 10/1980 | Vanderzee | |
| 4,402,783 | A | 9/1983 | Enders | |
| 5,547,538 | A * | 8/1996 | Siegenthaler | 156/415 |
| 6,827,119 | B2 | 12/2004 | Weaver et al. | |
| 6,913,052 | B2 | 7/2005 | Losey | |
| 7,287,568 | B2 | 10/2007 | Roedseth et al. | |
| 7,288,160 | B2 | 10/2007 | Roedseth et al. | |
| 2002/0195186 | A1 | 12/2002 | Takagi | |
| 2005/0115661 | A1* | 6/2005 | Zemla et al. | 156/132 |
| 2006/0102272 | A1 | 5/2006 | Iyanagi et al. | |
| 2009/0250156 | A1* | 10/2009 | Bigogno et al. | 156/123 |
| 2010/0096070 | A1 | 4/2010 | Mancini et al. | |
| 2010/0122775 | A1* | 5/2010 | De Graaf et al. | 156/415 |

FOREIGN PATENT DOCUMENTS

WO    WO 2010/064066    * 6/2010

OTHER PUBLICATIONS

European Patent Office, search report issued in related European application No. 11188346 dated Feb. 17, 2012.

* cited by examiner

*Primary Examiner* — Martin Rogers
(74) *Attorney, Agent, or Firm* — Wood, Herron & Evans LLP

(57) ABSTRACT

Apparatus and methods of forming a tire. A drum has an expansion device that is configured to turn-up the lateral ends of the tire carcass about respective bead-and-apex assemblies while generally maintaining a constant orientation of the bead-and-apex assemblies. Further, the expansion device turns-up the lateral ends of the tire carcass while at the same time radially expanding the tire carcass. The methods entail turning-up the lateral ends of the tire carcass around the bead-and-apex assemblies and also moving a portion of the tire carcass lying between the bead-and-apex assemblies in a radially-outward direction relative to an axis of rotation of the drum.

12 Claims, 16 Drawing Sheets

DRUM STATE "E"
75% Crown
Hubs in Tension

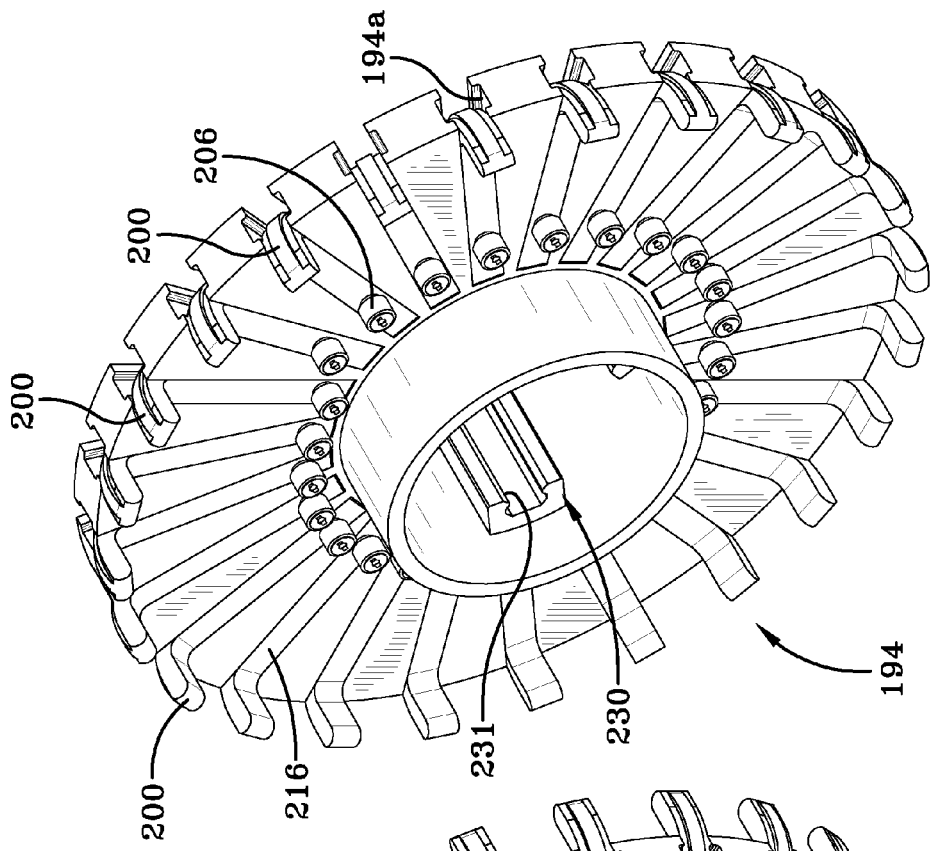
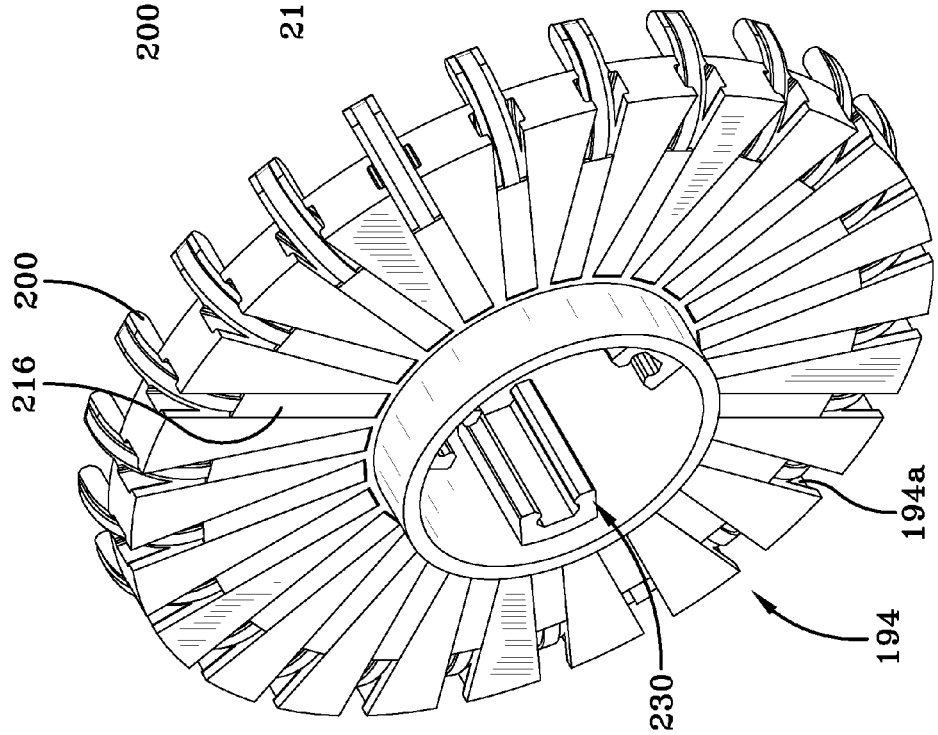

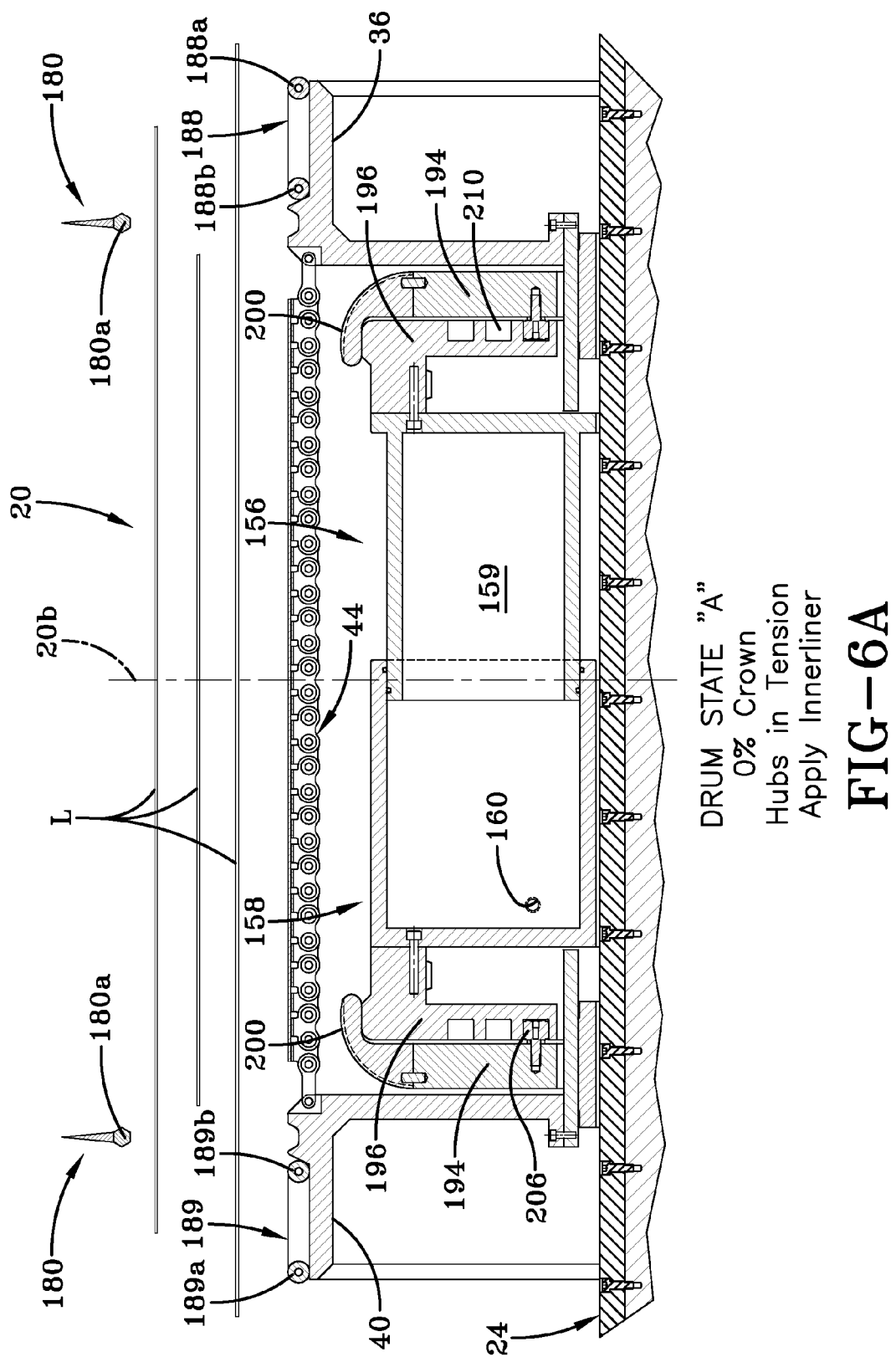

DRUM STATE "D"
50% Crown
Hubs in Tension

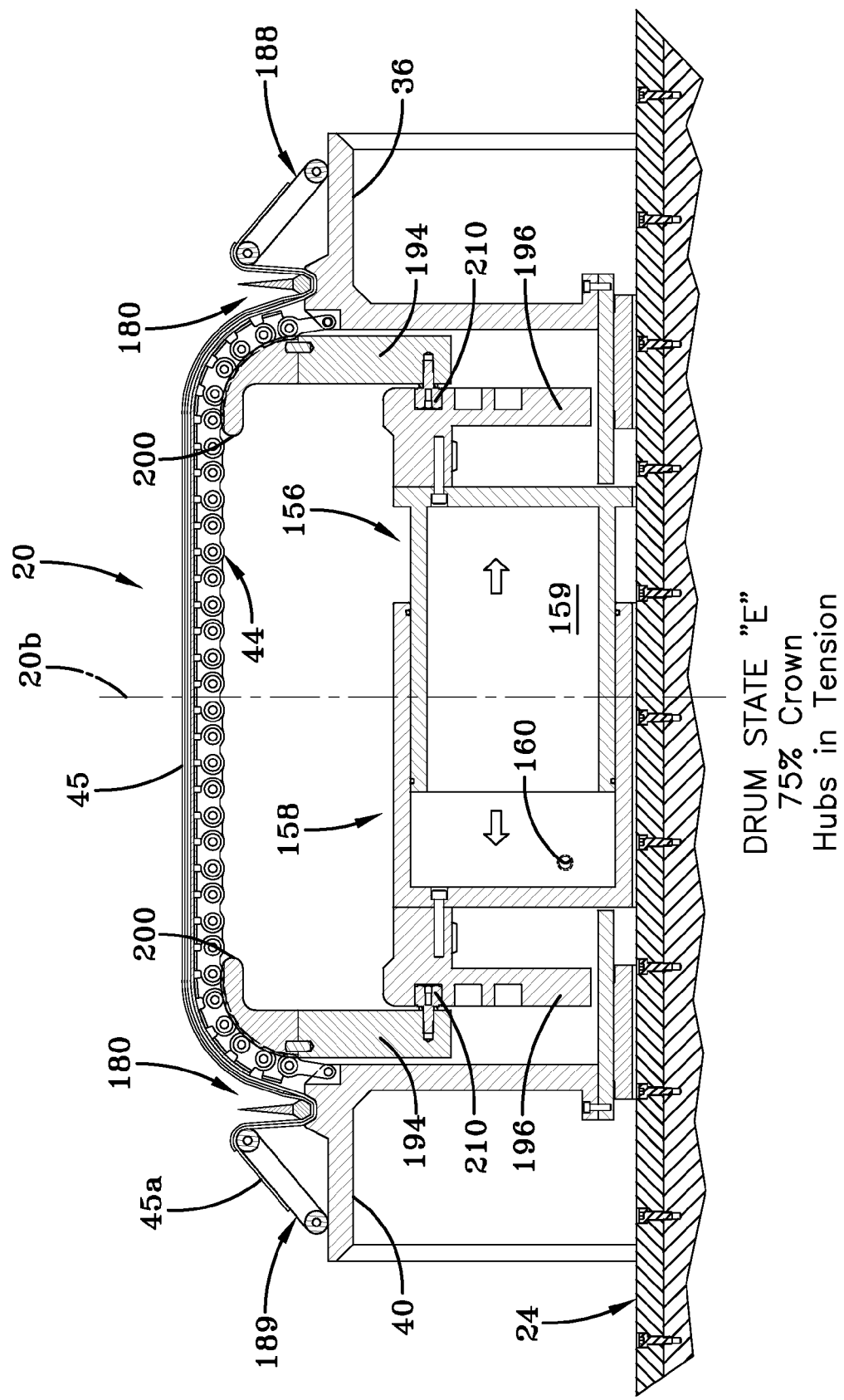

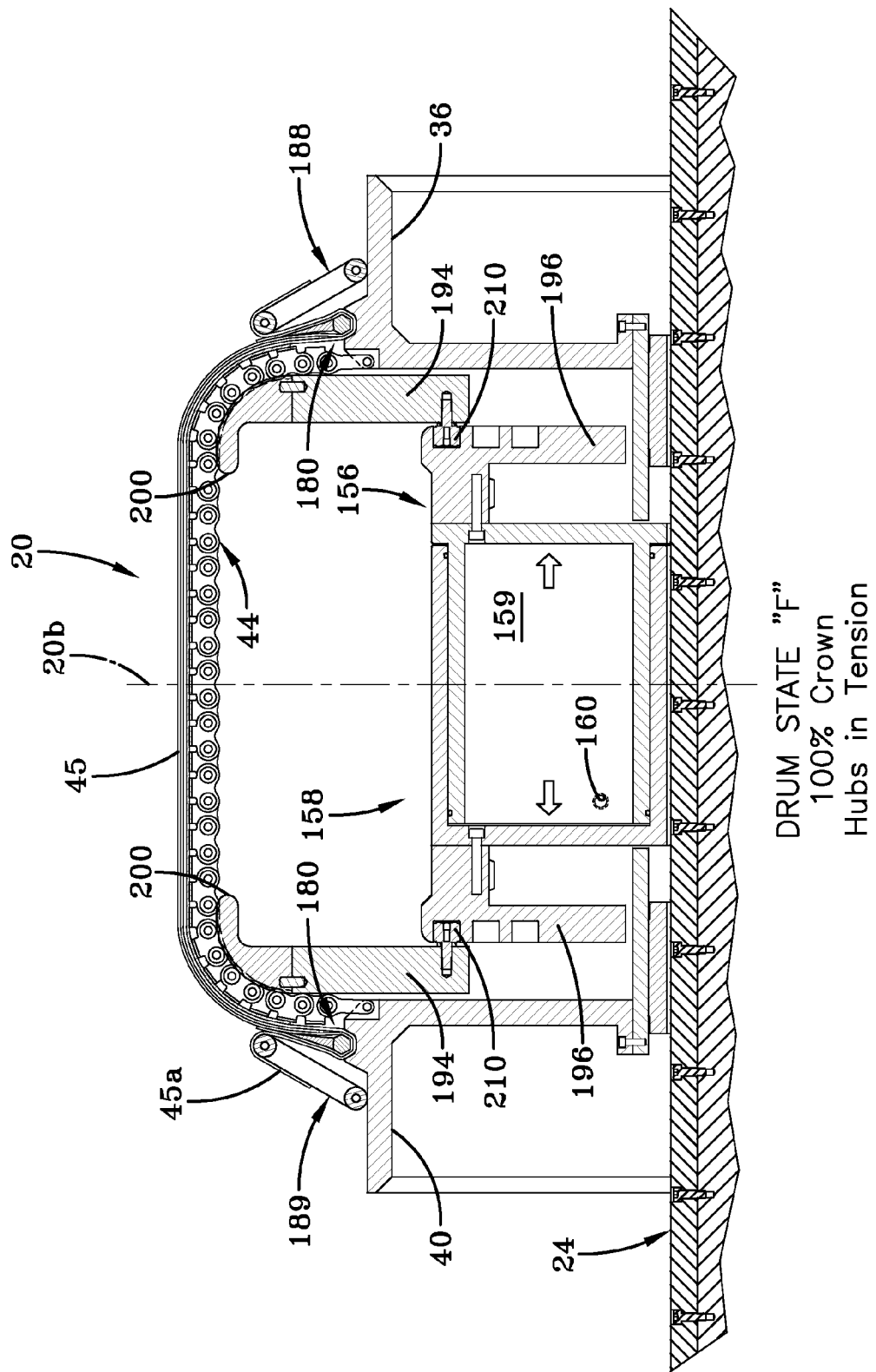

US 8,585,845 B2

TIRE-FORMING APPARATUS AND RELATED METHODS

BACKGROUND

The present invention generally relates to apparatus and methods for forming tires and, more particularly, to apparatus and methods for forming tires on a drum.

Tires may be fabricated by placing several tire components on a first drum so as to form a cylindrically-shaped tire carcass in a first stage of the tire-forming operation. The tire carcass may then be run through a second stage of the tire-forming operation by being transferred from the first drum onto a second drum where the tire carcass may be expanded into a toroidal shape and where additional components are applied, such as a belt package and rubber tread. The expanded carcass is then molded and vulcanized into a finished tire. Unfortunately, this fabrication process is time-consuming and requires two different drums, which adds complexity to the tire-forming operation.

To address this complexity, single-stage drums and related methods have been developed. In a known type of operation involving single-stage drums, a plurality of layers of material are applied onto a drum that has shoulder and center sections that are axially and radially movable. Movement of these sections permits forming of the layers of the tire carcass and expansion of the tire carcass on the same drum.

There are drawbacks with this type of operation, however. For example, apparatus with single-stage drums require stitching of apex bead components of the tire carcass over other layers prior to radial expansion of the carcass, which adds complexity and the time required to complete the operation. Additionally, complex controls are required to coordinate the axial and radial movement of the shoulder and center sections so as to prevent trapping of air in the tire carcass. Yet further, that type of operation involves stretching and relaxing of the rubber layers, which may result in permanent deformation of the rubber. This deformation in some cases leads to unpredictable placement of the rubber layer endings, which may be detrimental to tire uniformity.

Accordingly, a need exists for tire-forming apparatus and methods that address these and other drawbacks associated with conventional tire-forming apparatus and methods.

SUMMARY

In one embodiment, a method is provided for forming a tire. The method includes applying at least one carcass layer onto a drum that is rotatable about an axis of rotation, to thereby form a cylindrically-shaped unvulcanized tire carcass having opposed first and second lateral ends. A first bead-and-apex assembly is positioned proximate the first lateral end of the unvulcanized tire carcass. A second bead-and-apex assembly is positioned proximate the second lateral end of the unvulcanized tire carcass. The method includes turning-up the first lateral end of the unvulcanized tire carcass around the first bead-and-apex assembly, and turning-up the second lateral end of the unvulcanized tire carcass around the second bead-and-apex assembly. While turning-up the first and second lateral ends of the unvulcanized tire carcass around the first and second bead-and-apex assemblies, respectively, a portion of the tire carcass located between the first and second bead-and-apex assemblies is moved radially outward relative to the axis of rotation.

In a specific embodiment, the method includes maintaining a constant orientation of the first and second bead-and-apex assemblies during turning-up of the first and second lateral ends of the unvulcanized tire carcass around the first and second bead-and-apex assemblies, respectively, and during radially outward movement of the portion of the tire carcass between the first and second bead-and-apex assemblies. The method may include controlling a commonly actuatable mechanism to turn-up the first and second lateral ends around the first and second bead-and-apex assemblies, respectively, and to move the portion of the tire carcass between the first and second bead-and-apex assemblies radially outward relative to the axis of rotation.

Additionally or alternatively, the method may include supporting the substantial entirety of the circumference of the unvulcanized tire carcass with the drum while moving the portion of the tire carcass between the first and second bead-and-apex assemblies radially outward relative to the axis of rotation. Additionally, the method may include supporting the substantial entirety of the circumference of the unvulcanized tire carcass with a plurality of overlapping segments of the drum that are moveable relative to one another. Yet additionally, the method may include circumferentially sliding the plurality of overlapping segments relative to one another as the diameter of the unvulcanized tire carcass increases with movement of the portion thereof between the first and second bead-and-apex assemblies radially outward relative to the axis of rotation.

In another specific embodiment, the method includes stitching the first lateral end to another portion of the unvulcanized tire carcass while moving the portion of the tire carcass between the first and second bead-and-apex assemblies radially outward relative to the axis of rotation. The method may include axially moving the first and second bead-and-apex assemblies inward prior to turning-up the first and second lateral ends of the unvulcanized tire carcass. The method may additionally include engaging first and second side portions of the unvulcanized tire carcass with the first and second bead-and-apex assemblies, respectively, prior to turning-up the first and second lateral ends of the unvulcanized tire carcass.

In another embodiment, a method is provided for forming a tire. The method includes applying at least one carcass layer onto a drum that is rotatable about an axis of rotation, to thereby form a cylindrically-shaped unvulcanized tire carcass having opposed first and second lateral ends. A first bead-and-apex assembly is positioned proximate the first lateral end of the unvulcanized tire carcass, and a second bead-and-apex assembly is positioned proximate the second lateral end of the unvulcanized tire carcass. The method includes turning-up the first lateral end of the unvulcanized tire carcass around the first bead-and-apex assembly and turning-up the second lateral end of the unvulcanized tire carcass around the second bead-and-apex assembly. While turning-up the first and second lateral ends of the unvulcanized tire carcass around the first and second bead-and-apex assemblies, respectively, a portion of the tire carcass located between the first and second bead-and-apex assemblies is moved radially outward relative to the axis of rotation. The method includes maintaining a constant orientation of the first and second bead-and-apex assemblies during turning-up of the first and second lateral ends of the unvulcanized tire carcass around the first and second bead-and-apex assemblies, respectively, and during radially outward movement of the portion of the tire carcass between the first and second bead-and-apex assemblies. The method further includes circumferentially sliding a plurality of overlapping segments of the drum relative to one another as the diameter of the unvulcanized tire carcass increases with movement of the portion thereof between the first and second bead-and-apex assemblies radially outward relative to the axis of rotation.

In yet another embodiment, a full-stage high crown drum is provided for forming a tire having at least one carcass layer and first and second bead-and-apex assemblies, with the drum being rotatable about an axis of rotation. The drum has a pair of opposed, axially moveable hubs, and a support structure that extends between the two hubs and which is configured to support the at least one carcass layer thereon. The support structure includes a pair of bead housings, each configured to support one of the first or second bead-and-apex assemblies thereon. An expansion device of the drum is configured to engage the support structure and first and second lateral ends of the at least one carcass layer to turn-up the first and second lateral ends about the first and second bead-and-apex assemblies, respectively, while moving a portion of the carcass layer radially outward relative to the axis of rotation.

The support structure may include a plurality of overlapping segments that are configured to support the substantial entirety of the circumference of the at least one carcass layer. Additionally, the plurality of overlapping segments may include a first set of overlapping segments located at a first radial distance from the axis of rotation, and a second set of overlapping segments located at a second radial distance from the axis of rotation, with the first radial distance being different from the second radial distance.

The overlapping segments may be arranged in cascade fashion around the circumference of the drum. The drum may also include a shaft that extends along the axis of rotation of the drum, with the expansion device including a cam and a pair of lifters operatively coupled to the cam, such that rotation of the shaft is effective to rotate the cam to thereby move the lifters radially outward relative to the axis of rotation. The drum may also have a pneumatic element that is operatively coupled to the pair of opposed, axially moveable hubs, and which is configured to apply an axially outward force on the hubs relative to a centerline of the drum. The expansion device, in one embodiment, includes first and second turn-up elements that are configured to engage the first and second lateral ends of the at least one carcass layer, with the first and second turn-up elements being operatively coupled to the hubs so that axial movement of the hubs is effective to actuate the first and second turn-up elements to thereby turn-up the first and second lateral ends.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIGS. 4A and 4B are perspective views of a pair of outer disks of the drum of FIG. 3.

FIG. 6A is a partial cross-sectional view of the drum of FIG. 3, illustrating a step of an exemplary tire-forming process.

FIG. 6E is a view similar to FIG. 6A, illustrating another step of the exemplary tire-forming process.

FIG. 6F is a view similar to FIG. 6A, illustrating yet another step of the exemplary tire-forming process.

DEFINITIONS

"Apex" means an elastomeric filler located radially above the bead and interposed between the plies and the ply turn-up.

"Axial" and "axially" means the lines or directions that are parallel to the axis of rotation of the tire.

"Bead" means a circumferentially substantially inextensible metal wire assembly that forms the core of the bead area, and is associated with holding the tire to the rim.

"Bead-and-apex assembly" means a pre-formed structure comprising a bead and an apex and forming part of the tire carcass.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Cord" means one of the reinforcement strands of which the plies in the tire are comprised.

"Inner" means located toward the inside of the tire.

"Inner Liner" means a molded rubber layer covering the inner side of the carcass and facing the air chamber when the tire is assembled.

"Natural Rubber" means an elastic hydrocarbon polymer derived from latex, including the purified form referred to as polyisoprene.

"Outer" means located toward the exterior of the tire.

"Ply" or "Plies" means a calendered fabric thread coated with rubber and wound between the beads to form the conventional carcass of a tire.

"Pneumatic Tire" means a laminated mechanical device of generally toroidal shape, usually an open torus, having beads and a tread and made of rubber, chemicals, fabric, and steel or other materials. When mounted on the wheel of a motor vehicle, the tire through its tread provides traction and contains the fluid that sustains the vehicle load.

"Radial" and "radially" mean directions toward and away from the axis of rotation of the tire.

"Sidewall" means that portion of a tire between the tread and the bead area.

DETAILED DESCRIPTION

Figure 1:
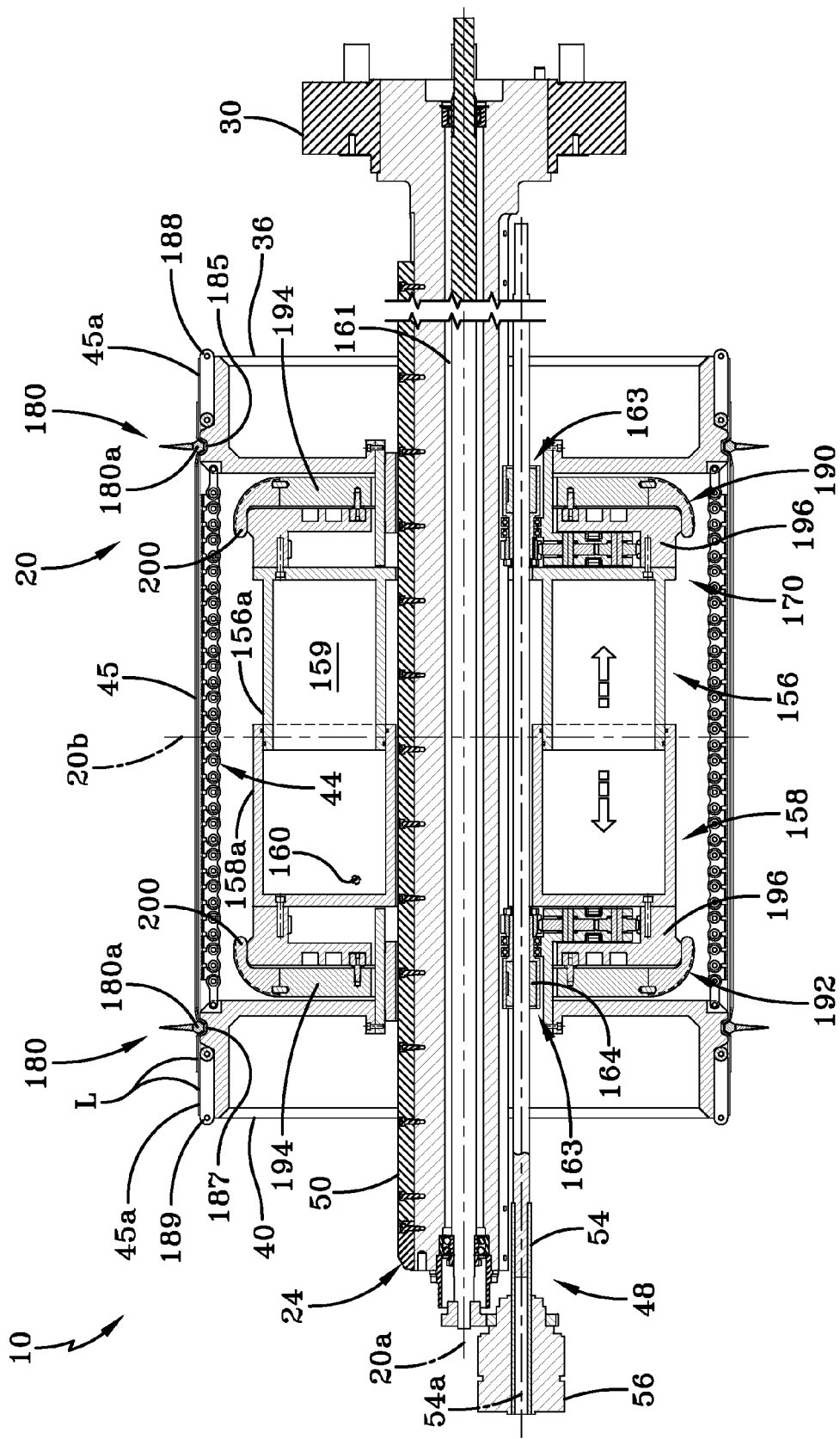
FIG. 1 is a broken-away cross-sectional view of a tire-forming apparatus.
Figure 2:
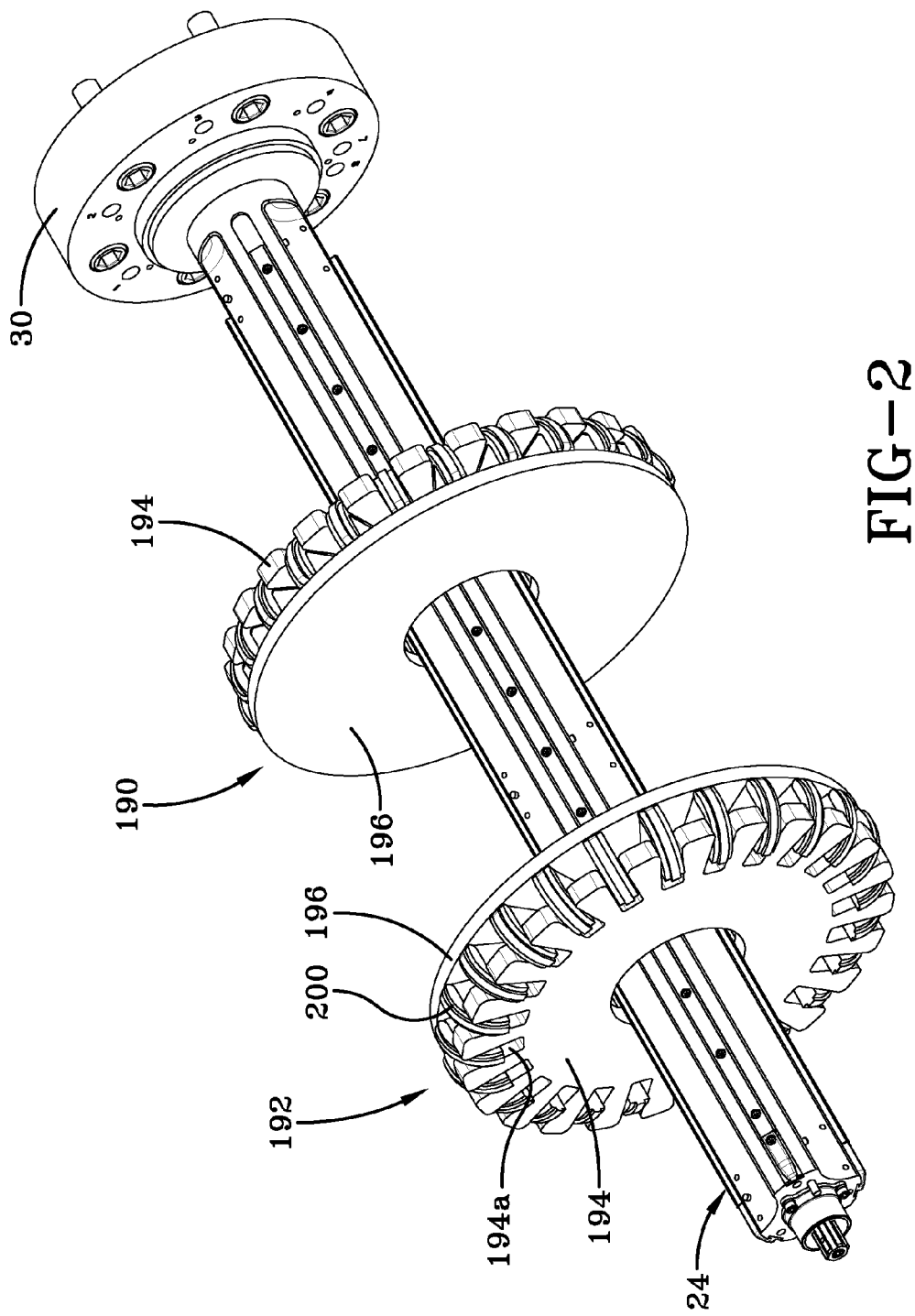
FIG. 2 is a partial perspective view of the apparatus of FIG. 1.
Figure 3:
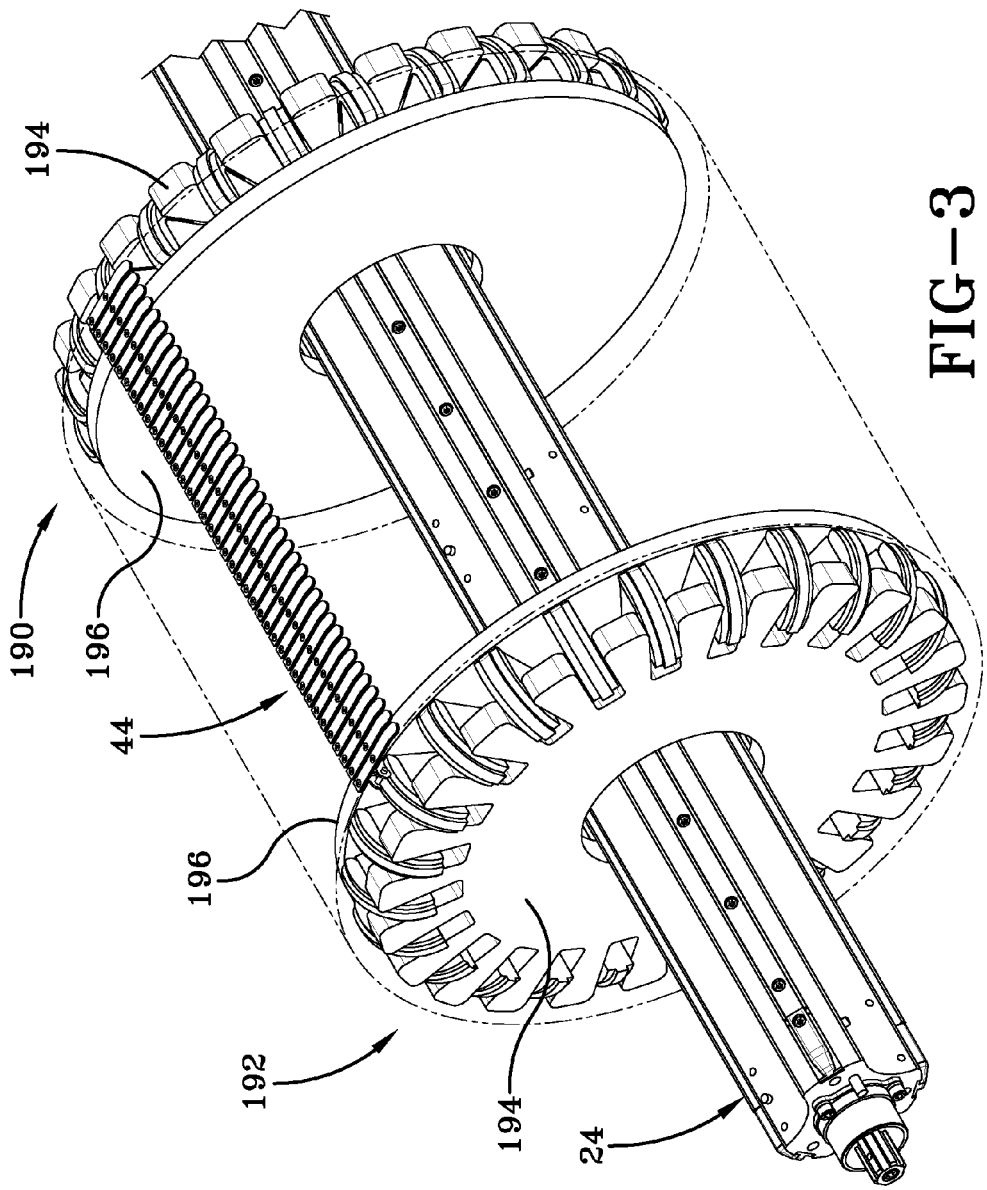
FIG. 3 is a partial perspective view of a drum of the tire-forming apparatus of FIGS. 1 and 2.

Referring now to the figures, and particularly to FIGS. 1-3, an exemplary embodiment of an apparatus 10 is provided for forming a tire, such as a radial passenger tire. The apparatus 10 includes a drum 20 that is rotatable about an axis of rotation 20a. The drum 20 is mounted on a central shaft 24 extending along the axis 20a, and which is coupled for rotation to a driver (not shown) through a driven support 30. The drum 20 includes a pair of opposed outboard assemblies 36, 40 that are movable along the axis 20a, and a support structure 44 extending between the outboard assemblies 36, 40. Jointly, the outboard assemblies 36, 40 and the support structure 44 define a supporting surface configured to receive thereon a plurality of layers L of material and other components that make up a cylindrically-shaped tire carcass 45. The support structure 44 is configured to axially contract and expand by virtue of axial movement of the outboard assemblies 36, 40, and is also configured to radially expand, as explained in further detail below.

The central shaft 24 forms part of a drum core assembly 48 that also includes a spindle 50 rotatable about axis 20a, an internal shaft 161, as well as an external shaft 54, as illustrated in FIG. 1. The internal shaft 161 delivers rotational input from an external motor. This rotation is independent of the rotation of spindle 50. The external shaft 54 rotates about an axis of rotation 54a that is offset from the axis of rotation 20a, and includes a clutch 56 controlling rotational motion of the external shaft 54. Clutch 56 couples the rotation of internal shaft 161 to external shaft 54. Optionally, the drum 20 may also include a second external shaft (not shown) driven by a respective clutch and which controls axial expansion or contraction of the drum 20. An exemplary pair of external shafts with respective clutches is disclosed in U.S. Pat. No. 6,827, 119, the disclosure of which is hereby expressly incorporated herein in its entirety.

The outboard assemblies 36, 40 are axially movable so as to selectively contract or expand the support structure 44. To this end, the outboard assemblies 36, 40 form part of respective hubs 156, 158 that are slidable relative to one another. More specifically, the outboard assembly 36 forms part of the first hub 156 while the outboard assembly 40 forms part of the second hub 158. The first hub 156 has a first engaging portion 156a disposed within a second engaging portion 158a of the second hub 158 so as to permit slidable movement of the first and second hubs 156, 158, and thus of the first and second outboard assemblies 36, 40, relative to one another. To this end, the second hub 158 includes an air inlet 160 that selectively receives and/or exhausts pressurized air from/to an outside source of air (not shown) and supplies it into a common chamber 159 of pressurized air that permits outward and inward movement of the second hub 158 relative to the first hub 156. Alternatively, the drum 20 may include a dedicated exhaust port or outlet (not shown) cooperating with the inlet 160 such that selective flow of air through the inlet 160 and through the outlet (i.e., into and from the common chamber 159) permits movement of the hubs 156, 158 relative to one another.

With continued reference to FIGS. 1-3, in one specific embodiment, the hubs 156, 158 are biased inwardly (i.e., in the absence of air in the common chamber 159). In that embodiment, air is selectively supplied into the hubs 156, 158 through the air inlet 160 so as to push the hubs 156, 158 outwardly, with their axial position being restricted by the coupling of the hubs 156, 158 with other components of the drum 20. For example, the drum 20 may include one or more rail locks (not shown) that can selectively fix the location of the hubs 156, 158 on the central shaft 24. In that embodiment, the rail locks may be additionally designed to be normally in a locked condition, and further be configured to be unlocked pneumatically. Slidable movement of the first and second hubs 156, 158 is facilitated by suitably chosen components such as one or more guide rails 232 of central shaft 24.

The external shaft 54 has a pair of spline gear assemblies 163, spaced from one another, and which include respective gears 164. The gears 164 are operatively coupled to respective cooperating components of a central portion of an expansion device, generally assigned numeral 170. The expansion device 170 is configured to engage the support structure 44 as well first and second lateral ends 45a of the unvulcanized tire carcass 45 supported by the support structure 44. Notably, the expansion device 170 is configured to turn-up the lateral ends 45a about respective pluralities of bead-and-apex assemblies 180 located proximate the ends 45a, while moving a central portion of the tire carcass 45 (i.e., between the assemblies 180) radially outward relative to the axis of rotation 20a, as more fully explained below.

With continued reference to FIGS. 1-3, the first and second outboard assemblies 36, 40 include features for supporting end portions of the one or more layers L making up the tire carcass 45 and for supporting and securing the orientation of the bead-and-apex assemblies 180. More specifically, the outboard assemblies 36, 40 include respective bead housings, in this embodiment in the form of depressions 185, 187, each of which snugly accommodates the bead portion 180a of a bead-and-apex assembly 180. The outboard assemblies 36, 40 also support respective pluralities of pivotable turn-up elements 188, 189 which form part of the expansion device 170, and which are configured to engage the lateral ends 45a of the tire carcass 45. The pluralities of turn-up elements 188, 189 are respectively located on each side of a central transverse axis or centerline 20b of drum 20.

The expansion device 170 also includes a pair of opposed end plates 190, 192 forming part of the first and second hubs 156, 158, respectively, and which are therefore also axially movable inwardly and outwardly relative to one another. Each of the end plates 190, 192 is made of an outer disk 194, an inner cam disk 196, and a plurality of radially movable lifters 200 circumferentially spaced from one another and supported within slotted openings 194a (FIG. 2) of the outer disk 194. During laying of the one or more layers L onto the support structure 44, the lifters 200 rest upon the closed ends of the slotted openings 194a and, in that position, do not extend beyond the circumference of the cam disk 196.

Figure 5A:
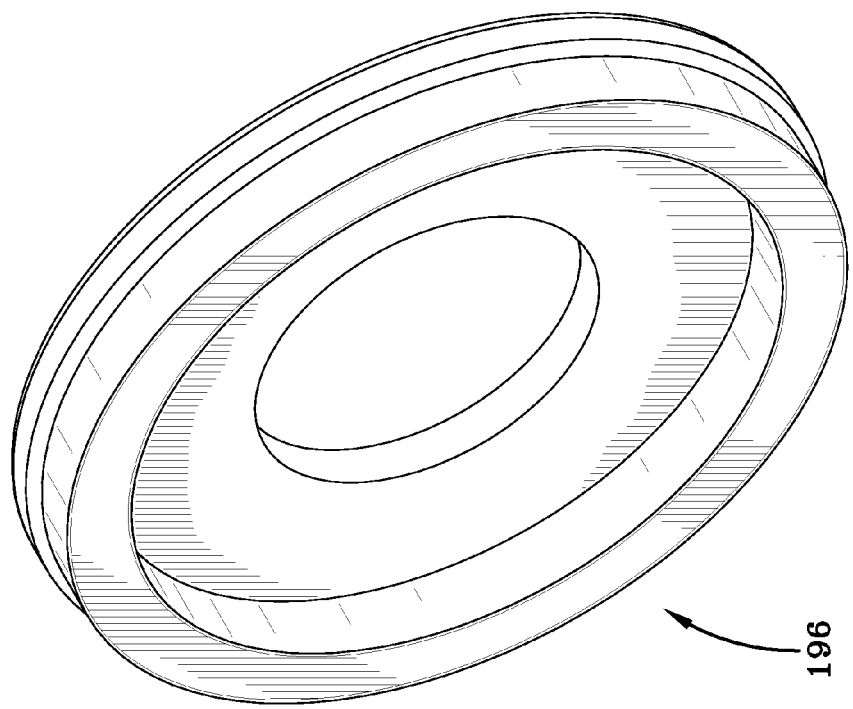
FIGS. 5A and 5B are perspective views of a pair of cam disks of the drum of FIG. 3.
Figure 5B:
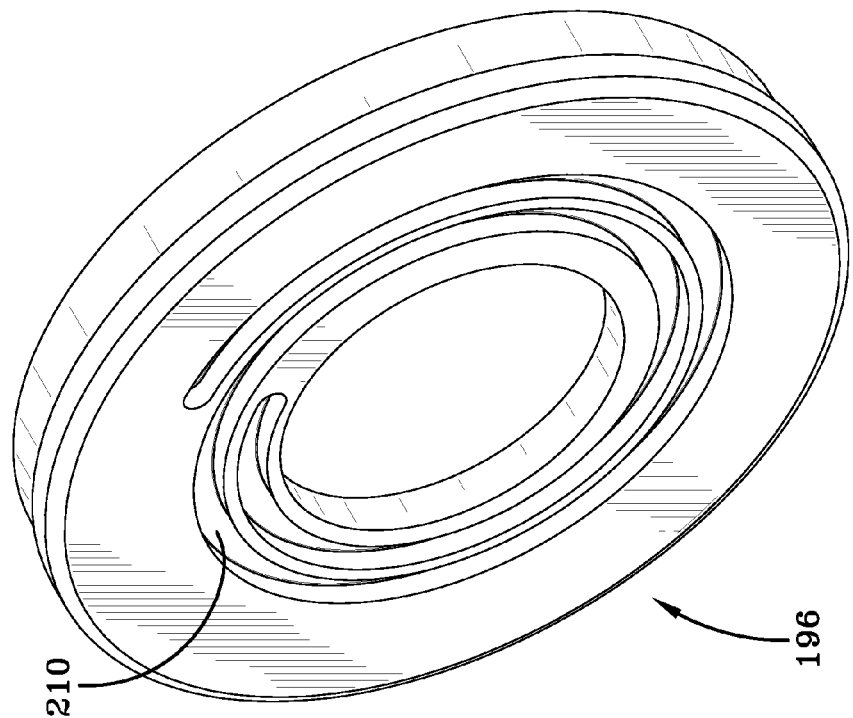

With continued reference to FIGS. 1-3, and further referring now to FIGS. 4A, 4B, 5A, and 5B, the lifters 200 are actuatable so as to move radially outward, with that radially outward movement being effective to engage and move the support structure 44 also radially outward. This radially outward movement of the lifters 200 is facilitated by engagement of a plurality of cam follower bearings 206 of the lifters 200 within respective spiral grooves 210 located on the axially outward-facing faces of the cam disks 196 (FIGS. 5A, 5B). More specifically, each lifter 200 has a support arm 216 to which the lifter 200 is coupled and which slides within slots in the outer disk 194. Each support arm 216 is movable radially with a corresponding lifter 200 and has a cam follower bearing 206 mounted onto the axially inward-facing face of the support arm 216. In operation, selective rotation of the cam disks 196 relative to the outer disks 194 results in the bearings 206 following the path defined by the spiral grooves 210, which results in radially outward or inward movement of the lifters 200. This movement, in turn, automatically increases or decreases the overall diameter of the drum 20, respectively.

Selective rotation of the cam disks 196 is effected through actuation of a motor (not shown) that drives rotation of the external shaft 54 through clutch 56 (FIG. 1). In one aspect of the illustrated embodiment, the cam disks 196 are secured onto the external shaft 54 through a plurality of engaging elements 230 having respective C-shaped channels 231, each of which receives there along one of the plurality of guide rails 232 of the exemplary external shaft 54, as illustrated in FIGS. 4A, 4B, 10A, and 10B.

Figure 6B:
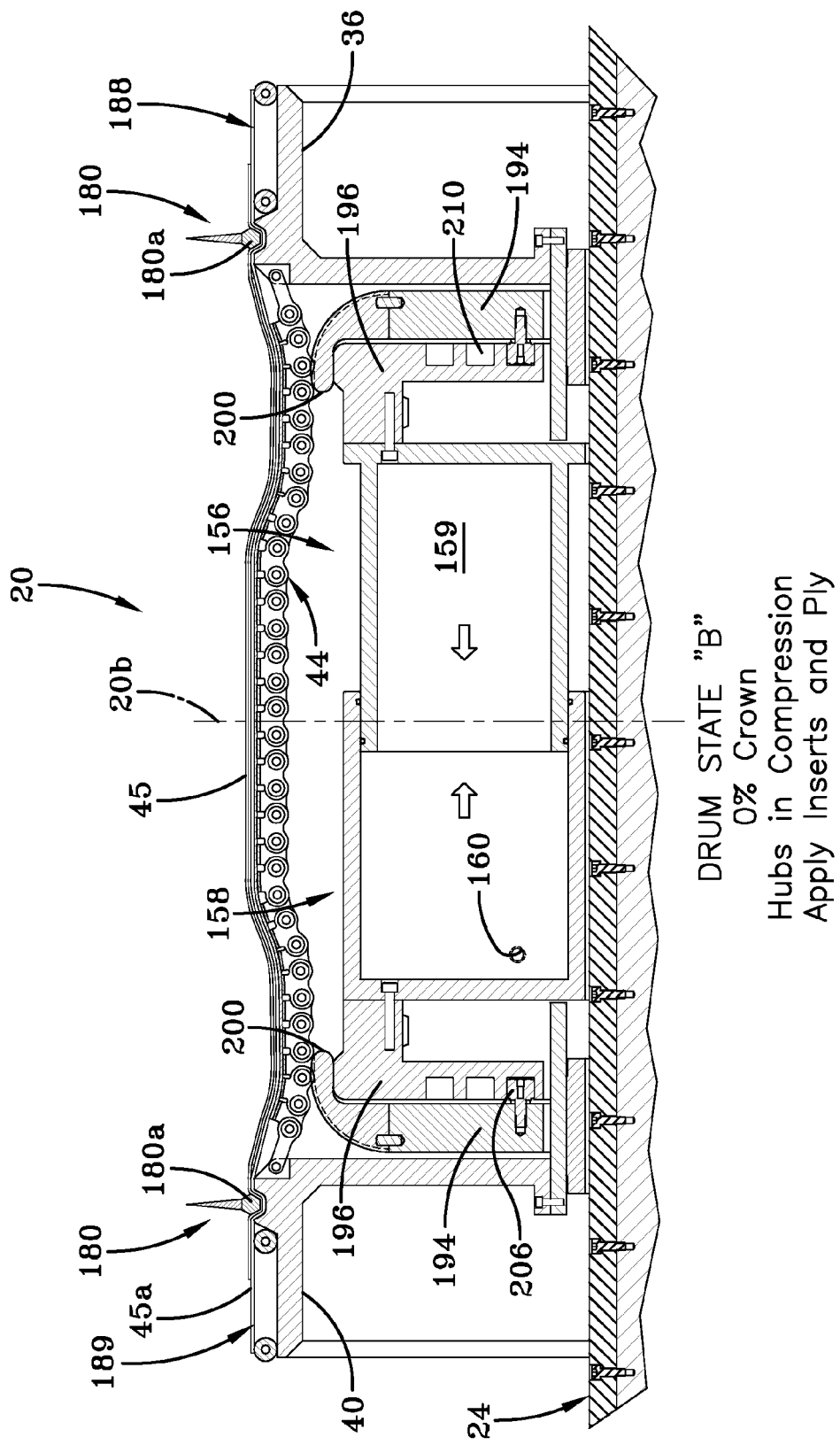
FIG. 6B is a view similar to FIG. 6A, illustrating another step of the exemplary tire-forming process.
Figure 6C:
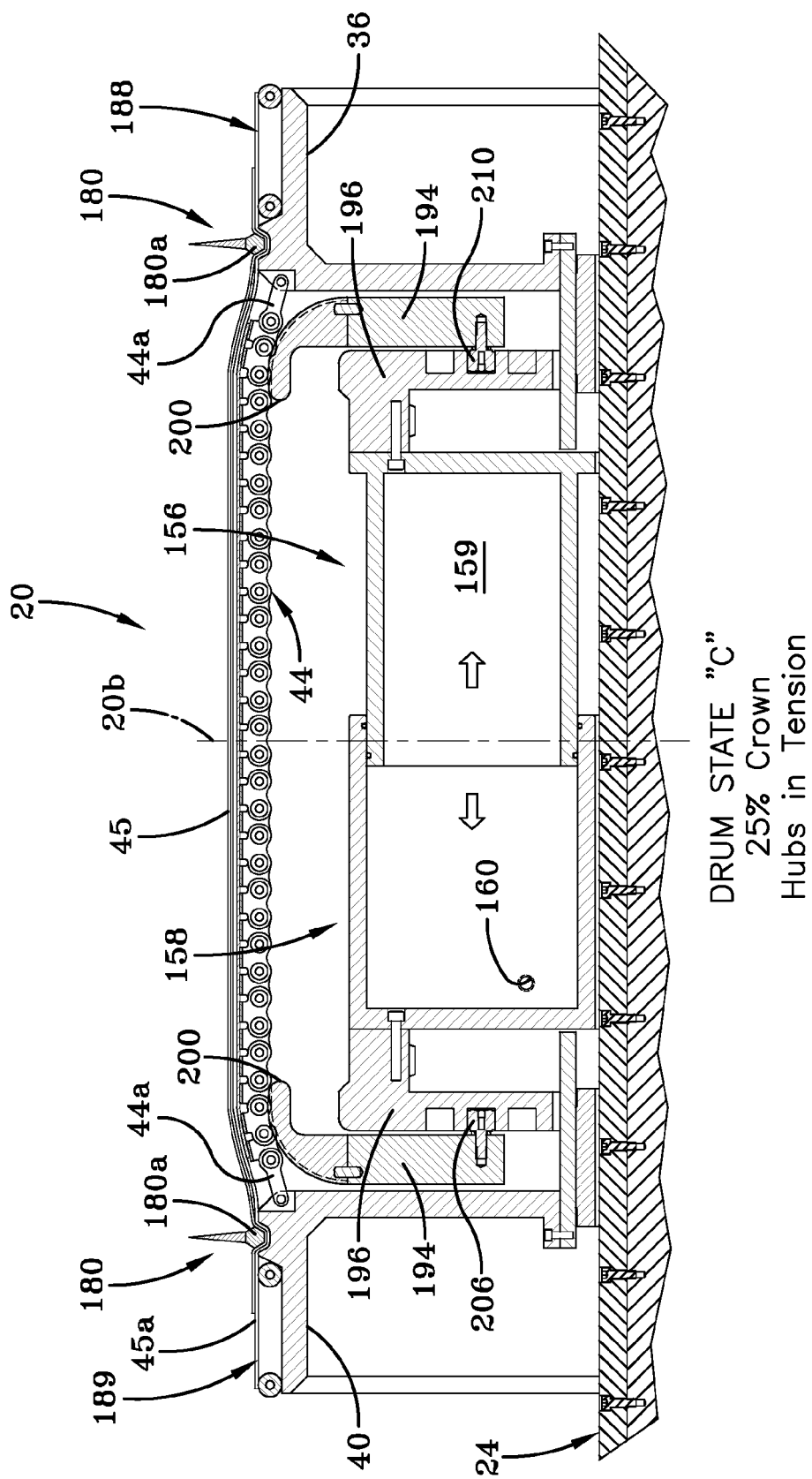
FIG. 6C is a view similar to FIG. 6A, illustrating another step of the exemplary tire-forming process.
Figure 6D:
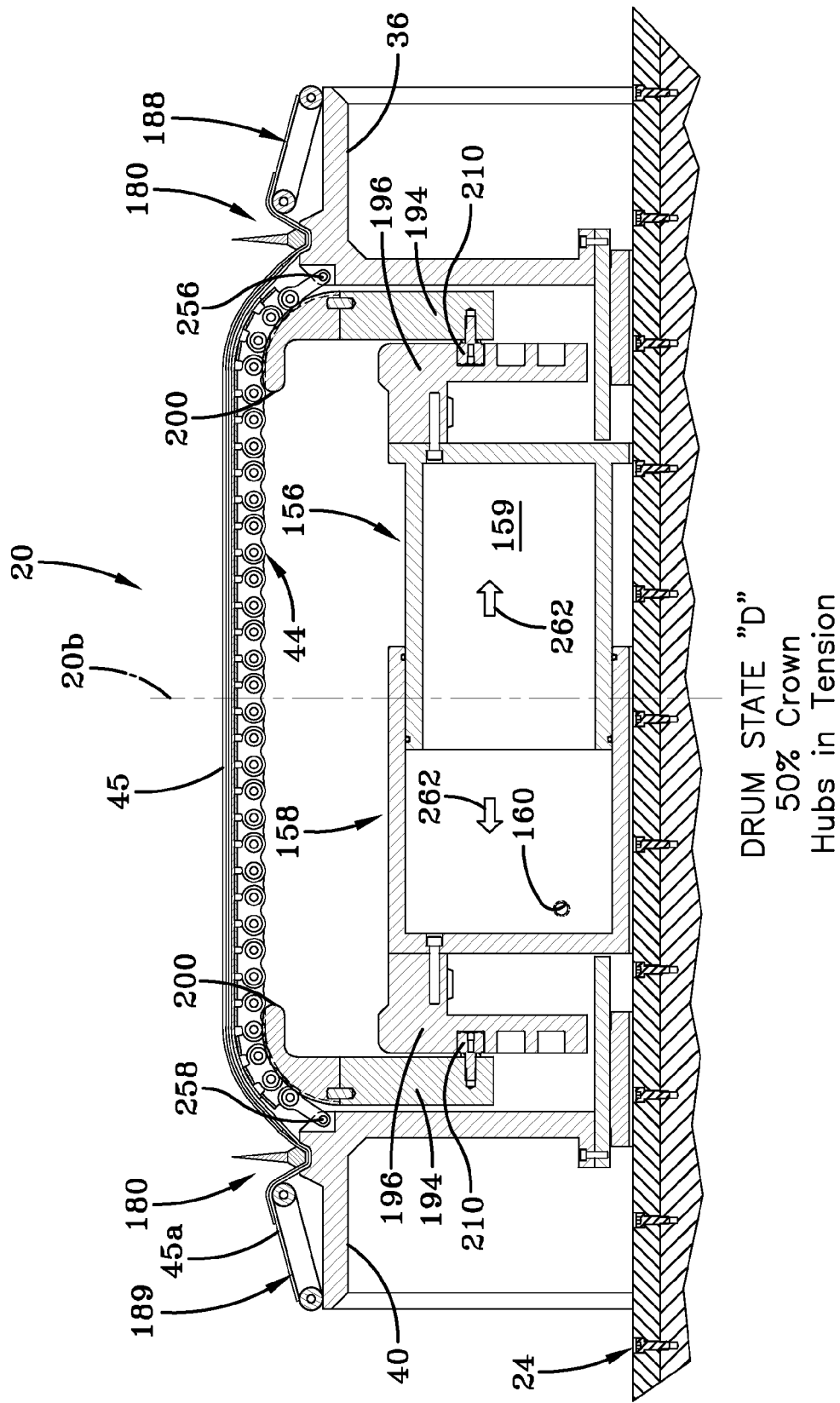
FIG. 6D is a view similar to FIG. 6A, illustrating another step of the exemplary tire-forming process.
Figure 7:
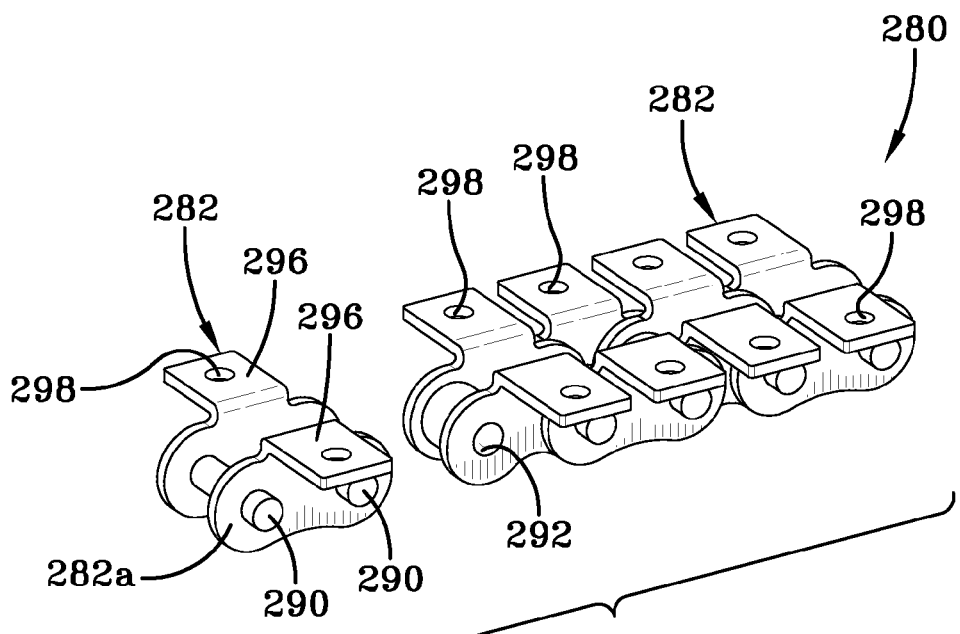
FIG. 7 is a perspective view of a chain link assembly forming part of the drum of FIG. 3.
Figure 8A:
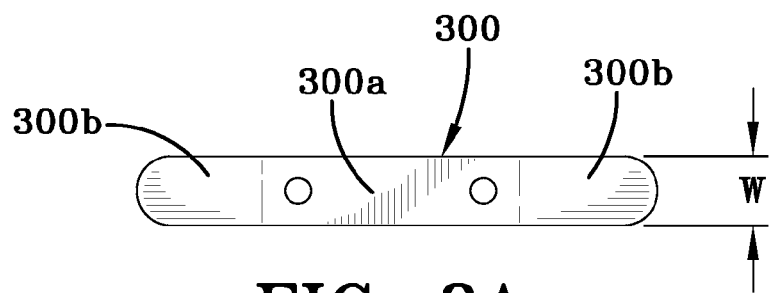
FIG. 8A is a top view of a leaf element of the drum of FIG. 3.
Figure 8B:
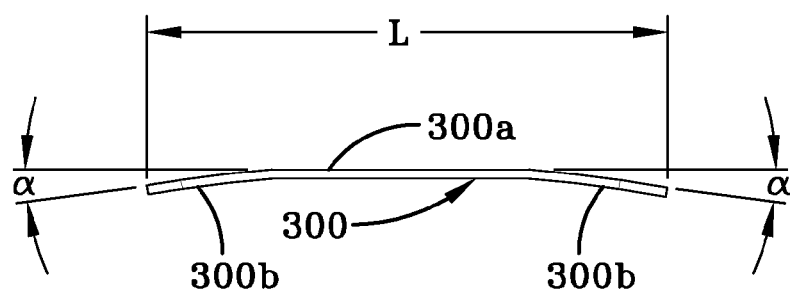
FIG. 8B is a side view of the leaf element of FIG. 8A.

With particular reference to FIGS. 1, 4A, and 4B, and further referring to FIGS. 6A-6F, the expansion device 170 also includes, as discussed above, a pair of pivoting turn-up elements 188, 189. The turn-up elements 188, 189 are respectively operatively coupled to the first and second hubs 156, 158. This operative coupling is such that axially (i.e., along axis 20a) inward and outward movement of the hubs 156, 158 beyond predetermined axial positions of the hubs 156, 158 automatically results in pivoting movement of the turn-up elements 188, 189. More specifically, as illustrated in FIGS. 1 and 6A, the turn-up elements 188, 189 have a generally flat orientation, parallel to axis 20a, associated with a relatively axially expanded condition of the drum 20. As the hubs 156, 158 are moved inwardly reactively by radial expansion of the device 170 acting upon support 44 in tension, toward the central transverse axis or centerline 20b of the drum 20, and particularly once the hubs 156, 158 reach respective predetermined positions relative to the transverse axis 20b, the turn-up elements 188, 189 begin to pivot, as illustrated in FIG. 6D, for example. Continued inward movement of the hubs 156, 158 results in continued pivoting movement of the turn-up elements 188, 189, as illustrated in FIGS. 6E and 6F, for example, toward a generally radial orientation (i.e., generally perpendicular to axis 20a).

Pivotal movement of the turn-up elements 188, 189 is effective to engage the lateral ends 45a of the tire carcass 45 (FIG. 1), and effective to wrap the lateral ends 45a about the respective bead-and-apex assemblies 180, as illustrated in FIGS. 6D-6F. To this end, each of the turn-up elements 188, 189 has a first roller 188a, 189a that is configured to roll over the respective outboard support assembly 36, 40 during pivoting movement of the turn-up elements 188, 189, and a second roller 188b, 189b that rotates to permit rolling movement of the ends 45a relative to the turn-up elements 188, 189. Notably, the wrapping of the ends 45a is such that the orientation of the bead-and-apex assemblies 180 is maintained generally constant. In this specific embodiment, the generally constant orientation of the bead-and-apex assemblies 180 is generally perpendicular to the axis 20a, though this orientation is intended to be exemplary rather than limiting.

Operation of the drum 20 for forming a tire is illustrated with respect to the exemplary sequence of FIGS. 6A-6F. With particular reference to FIG. 6A, the drum 20 is illustrated in a first condition, having its minimum diameter and maximum axial dimension (i.e., width). In that condition as well, the hubs 156, 158 are spaced from one another at a maximum available operational distance, and the support structure 44 is generally flat and under axial tension, by virtue of the connection between the support structure 44 and the hubs 156, 158. In this condition of the drum 20, one or more of the layers L of tire carcass 45 are applied onto the outer surface of the drum 20. The layers L include materials suitably chosen and well known to those or ordinary skill in the art of tire manufacture. For example, and without limitation, the layers L may include one or more layers of rubber material and/or one or more metallic or non-metallic ply cords. In the illustrated embodiment, in a non-limiting example, only an inner layer or inner liner of material is applied onto the outer surface of the drum 20 in the stage of the process shown in FIG. 6A.

With particular reference to FIG. 6B, the hubs 156, 158 are shown having slightly moved inwardly. This position of the hubs 156, 158 is achieved, in this embodiment, by exhausting some of the air to vacuum from common chamber 159 through the air inlet 160 or through an outlet (not shown), so that the relatively lower pressure of the air in the common chamber 159 causes the hubs 156, 158 to move inwardly, toward their natural position. This inward movement of the hubs 156, 158 causes the support structure 44 to droop, as shown in FIG. 6B. At this stage of the process, one or more inserts (not shown) and/or ply cords may be placed on top of the inner layer or inner liner. At this stage also, the bead-and-apex assemblies 180 are also applied onto the outer surface of the drum 20. While not shown, the drum 20 may include a feature (e.g., a stop) to limit the radially inward movement of portions of the support structure 44 when the hubs 156, 158 are moved axially inward.

FIG. 6C illustrates another stage of the exemplary tire-forming process in which air has been supplied into the common chamber 159 so as to cause the hubs 156, 158 to move outwardly. This outward movement of the hubs 156, 158 causes a central portion of the support structure 44 to achieve a generally flat shape, as seen in the figure. Notably, the illustrated stage of the process also includes radially outward movement of the lifters 200, achieved, as discussed above, by rotation of the external shaft 54 and the resulting rotation of the cam disks 196. The radially outward movement of the lifters 200 causes the lifters 200 to engage the support structure 44 so as to lift the central portion of the support structure 44, while allowing end portions 44a thereof to bend radially inward. The stage illustrated in FIG. 6C corresponds to partial (e.g., about 25%) crowning of the tire carcass 45.

Referring now to FIG. 6D, that figure illustrates another stage in the exemplary tire-forming process, corresponding to about 50% crowning of the tire carcass 45. In this stage, the lifters 200 have moved radially outward relative to the position shown in FIG. 6C. This movement further raises the central portion of support structure 44, which causes the hubs 156, 158 to move inwardly, by virtue of the pivotal coupling between the support structure 44 and the hubs 156, 158 at locations 256, 258. In this stage of the process, the pressurized air in common chamber 159 acts to exert an outwardly force on the hubs 156, 158 (arrows 262), which is effective to maintain a generally flat shape of the central portion of support structure 44. In this stage, moreover, the position attained by the hubs 156, 158 results in pivotal movement and thereby a reorientation of the turn-up elements 188, 189. As illustrated in FIG. 6D, pivoting movement of the turn-up elements 188, 189 causes the ends 45a of the tire carcass 45 to begin to wrap around the bead-and-apex assemblies 180, while the assemblies 180 are secured in place, supported in the depressions 185, 187.

FIG. 6E illustrates yet another stage of the exemplary tire-forming process, corresponding to about 75% crowning of the tire carcass 45. In this stage, the lifters 200 have raised the central portion of support structure 44, resulting in further inward movement of the hubs 156, 158. As was the case with the stage illustrated in FIG. 6D, pressurized air in common chamber 159 continues to exert an outwardly force on the hubs 156, 158 (arrows 262), which is effective to maintain a generally flat shape of the central portion of support structure 44, generally parallel to the axis 20a. In the stage illustrated in FIG. 6D, the ends 45a of the tire carcass 45 have been further wrapped around the bead-and-apex assemblies 180 by virtue of the pivotal movement of the turn-up elements 188, 189.

FIG. 6F illustrates a stage of the exemplary tire-forming process that corresponds to complete (i.e., 100%) crowning of the tire carcass 45. In this regard, the lifters 200 are at their highest (i.e., outmost radial) operational position, thereby resulting in the drum 20 having its largest operational diameter. Similarly, the hubs 156, 158 are at their inwardly-most position, while being under tension i.e., having an outwardly-directed force exerted by the pressurized air in common chamber 159. In the illustrated stage, moreover, the ends 45a of the tire carcass 45 have been completely wrapped around the bead-and-apex assemblies 180 and are in contact with the central portion of the tire carcass 45. In this regard, and while not shown, a stitching device may be used to stitch the ends 45a to the central portion of the tire carcass 45. If stitching is effected, it is understood that the same may be effected upon completion of the crowning process, as noted above, or alternatively prior to completion of the crowning process. In that regard, it is contemplated that stitching of the lateral ends 45a of the tire carcass 45 to other portions thereof may be effected while the central portion of the tire carcass 45 is moving radially outward during crowning. This ability to stitch the ends 45a during crowning reduces the total time required for forming a tire relative to conventional tire-forming methods, in which stitching may be effected prior to starting of the crowning process.

Notably, the stage of the process illustrated in FIG. 6F also shows the bead-and-apex assemblies 180 having an orientation that is generally perpendicular to the axis 20a, similar to the orientation of the assemblies 180 in the stages illustrated in FIGS. 6A-6E. The generally constant orientation of the assemblies 180 during the tire-forming process avoids the drawbacks of conventional tire-forming processes, in which the orientation of the assemblies 180 varies, and which accordingly results in stretching and, even permanent deformation of at least some components of the tire carcass 45, such as ply cords and the apex components. More specifically, the constant orientation of the assemblies 180, as well as the fixed axial length of the support 44, facilitates maintaining a substantially constant length of those components of the tire carcass 45, such as ply cords.

As explained above, actuation of the clutch 56 induces rotation of the cam disks 96 (i.e., through rotation of external shaft 54), which moves the lifters 200 radially outward, with this movement resulting in a corresponding radially outward movement of the central portion of support structure 44 and of the tire carcass 45 supported thereby. Actuation of the clutch 56 also results, as explained above, in turning-up of the lateral ends 45a about the bead-and-apex assemblies 180, by virtue of the inward movement of the hubs 156, 158 to which the turn-up elements 188, 189 are operatively coupled. In this regard, the method facilitated by drum 20 may include actuation of a single mechanism that accomplishes simultaneous crowning and turn-up in the formation of the tire carcass 45. This is in stark contrast to conventional methods in which the turn-up and crowning operations require actuation of different mechanisms and coordination in the timing of actuation of those mechanisms, which makes those conventional methods relatively complex.

Referring now to FIGS. 7, 8A, 8B, 9A, 9B, 10A, 10B, 11A, 11B, 11C, 12A, and 12B, those figures illustrate exemplary embodiments of the support structure 44 and components making up that support structure 44. In the embodiment shown in FIGS. 7-10B, the support structure 44 includes a chain link assembly 280 that is in turn made up of a plurality of links 282, and a plurality of leaf assemblies 284 (FIG. 9A) supported by the links 282. More specifically, and with particular reference to FIG. 7, each link 282 has a main body portion 282a including either a pair of pins 290 or a pair of pin-receiving apertures 292 that are configured to receive pins 290 of adjacent links 282, as illustrated in that figure. Coupling of adjacent links 282 by inserting pins 290 into the apertures 292 of adjacent links 282 results in the formation of the chain link assembly 280. Each of the links 282 also includes a pair of opposed flanges 296 having respective holes 298 that are used for coupling a leaf assembly 284 thereto.

Figure 9A:
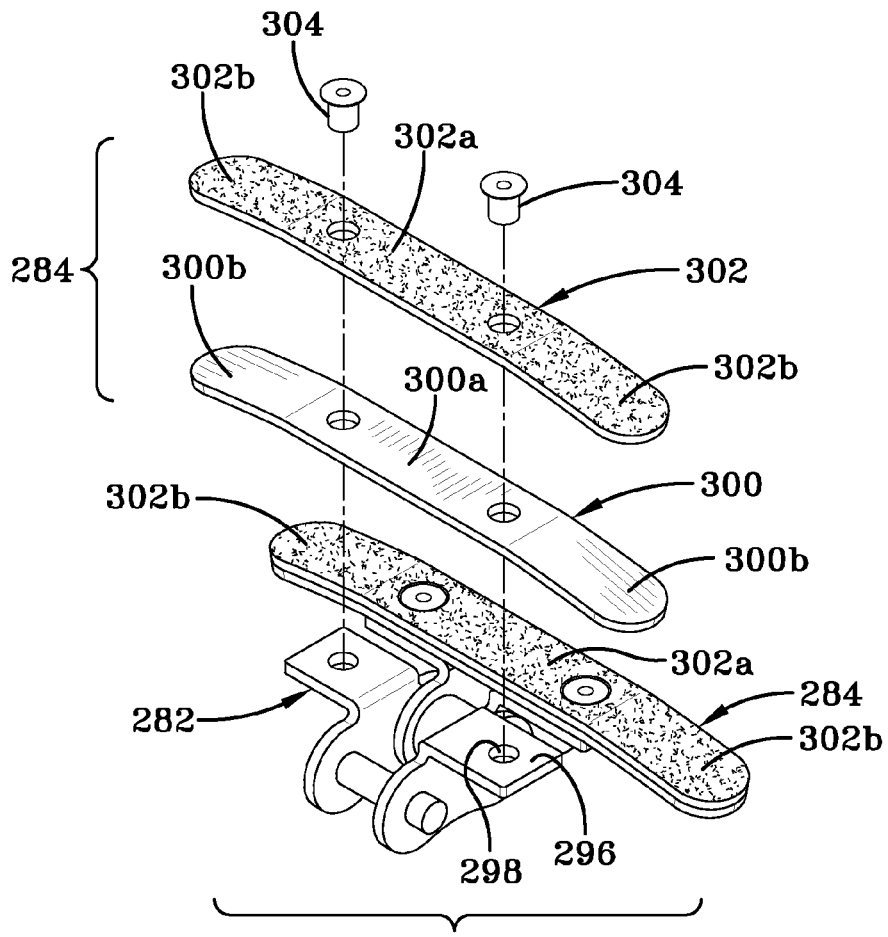
FIG. 9A is a perspective, partially exploded view of a portion of a support structure of the drum of FIG. 3.
Figure 9B:
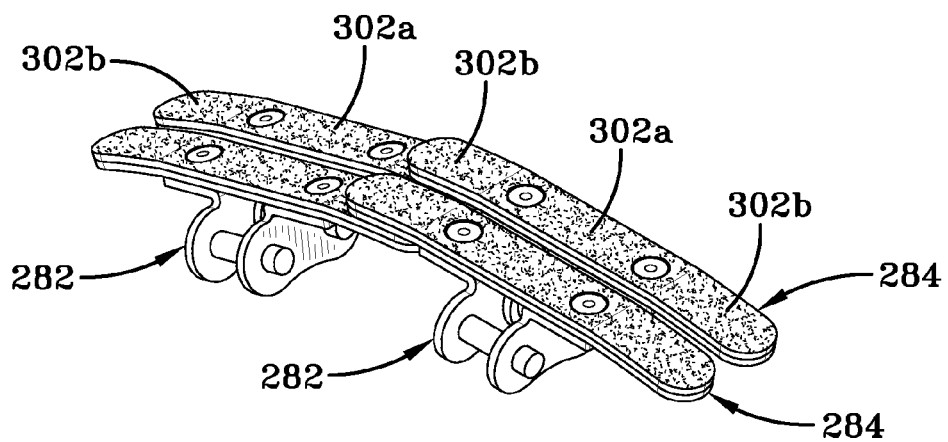
FIG. 9B is a perspective view of an assembled portion of the support structure of the drum of FIG. 3.

FIGS. 8A, 8B, 9A, and 9B illustrate other aspects of the exemplary construction of the chain link assembly 280. Specifically, those figures illustrate a leaf assembly 284 having an elongate leaf element 300 being directly coupled to one of the links 282, and a similarly shaped fabric element 302 being coupled onto the leaf element 300 through a pair of fasteners 304 inserted through corresponding holes of the leaf element 300 and fabric element 302 and received within the holes 298 of flanges 296. The axial spacing (i.e., in the direction of axis of rotation 20a) of the links 282 and, particularly, the axial spacing of link assemblies 284 coupled to them, is such that they provide a substantially continuous supporting surface, in the axial direction, for substantially supporting the entire width of the tire carcass 45 during tire formation, as best illustrated in FIG. 9B.

Figure 10B:
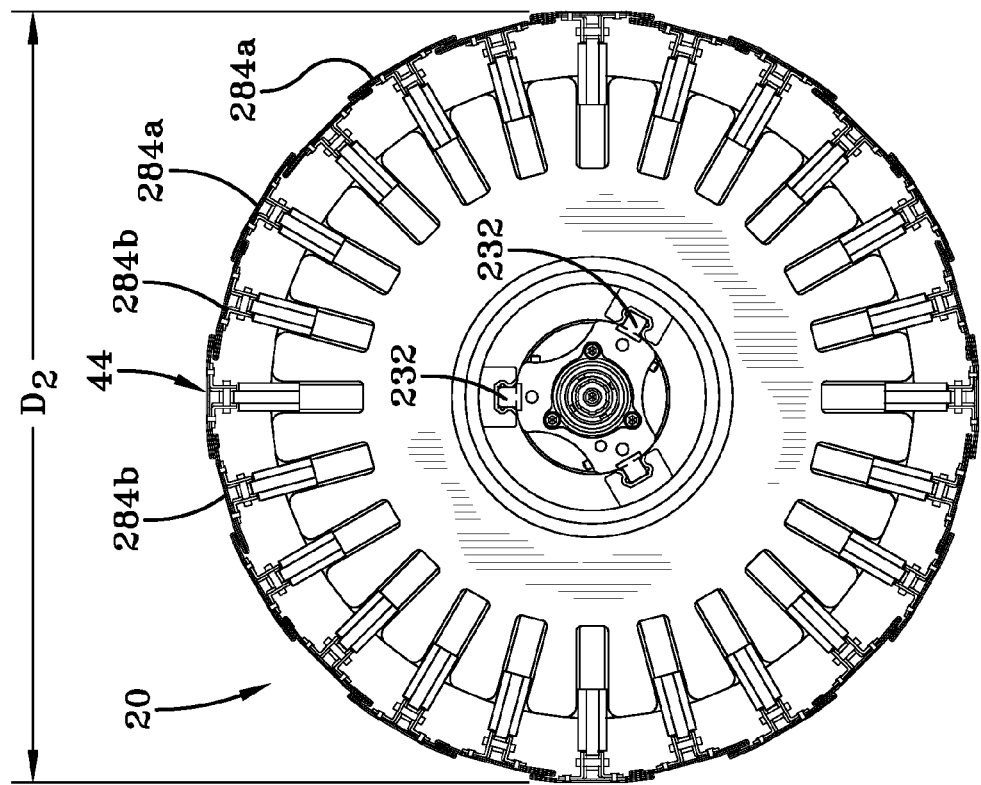
FIG. 10B is a view similar to FIG. 10A, illustrating the drum in a radially expanded condition.
Figure 10A:
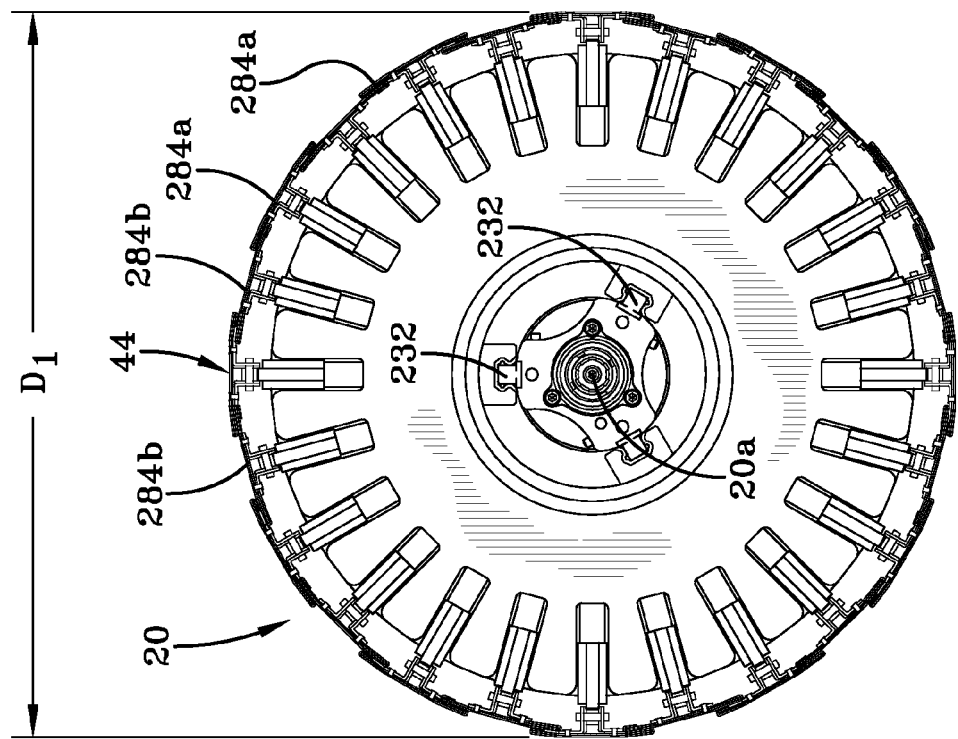
FIG. 10A is an end view of the drum of FIG. 3, illustrating an exemplary support structure in accordance with one embodiment of the invention.

Notably, in the shown embodiment, the support structure 44 defined by the links 282 and leaf assemblies 284 is also configured to provide a substantially continuous circumferential supporting surface for the tire carcass 45, which supports the substantial entirety of the circumference of the tire carcass 45 during tire formation. To this end, the support structure 44 has circumferentially adjacent segments or leaf assemblies 284 that overlap one another in the circumferential direction, as illustrated in FIGS. 9B, 10A, and 10B, for example.

In one aspect of the embodiment shown in FIGS. 7, 8A, 8B, 9A, and 9B, each leaf element 300 has a generally flat central portion 300a and a pair of longitudinal end portions 300b, each of which is bent radially inward. Similarly, in that embodiment, each fabric element 302 has a central portion 302a and a pair of longitudinal end portions 302b also bent radially inward. Referring particularly to FIGS. 10A and 10B, those figures illustrate an arrangement of the leaf assemblies 284 in which a first plurality of leaf assemblies 284a circumferentially spaced from one another are located at a first radius (i.e., the distance from the center of the drum 20), while a second plurality of leaf assemblies 284b are also circumferentially spaced from one another and located at a second radius, different from the first radius.

The leaf assemblies 284a, 284b are staggered, as illustrated in those figures. Notably, the arrangement of the leaf assemblies 284a, 284b results in a continuous supporting surface of the support structure 44 in the circumferential direction, even during crowning, as the drum 20 increases in diameter from a first diameter $D_1$ to a second diameter $D_2$. More specifically, as the diameter of the drum 20 increases from the first diameter $D_1$ to the second diameter $D_2$, the leaf assemblies 284a, 284b slide circumferentially relative to adjacent leaf assemblies 284a, 284b, thus allowing for expansion in the circumference of drum 20. As illustrated in FIGS. 10A and 10B, the end portions 300b and 302b of the leaf and fabric elements 300, 302, respectively, are configured to generally conform to the circular profile of the drum 20, and facilitate maintaining contact between adjacent leaf assemblies 284a, 284b, as shown in those figures.

Figure 11A:
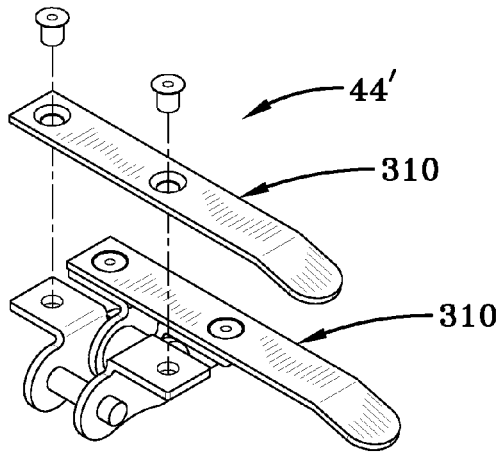
FIG. 11A is a partial view of a portion of a support structure in accordance with another embodiment of the invention.
Figure 11B:
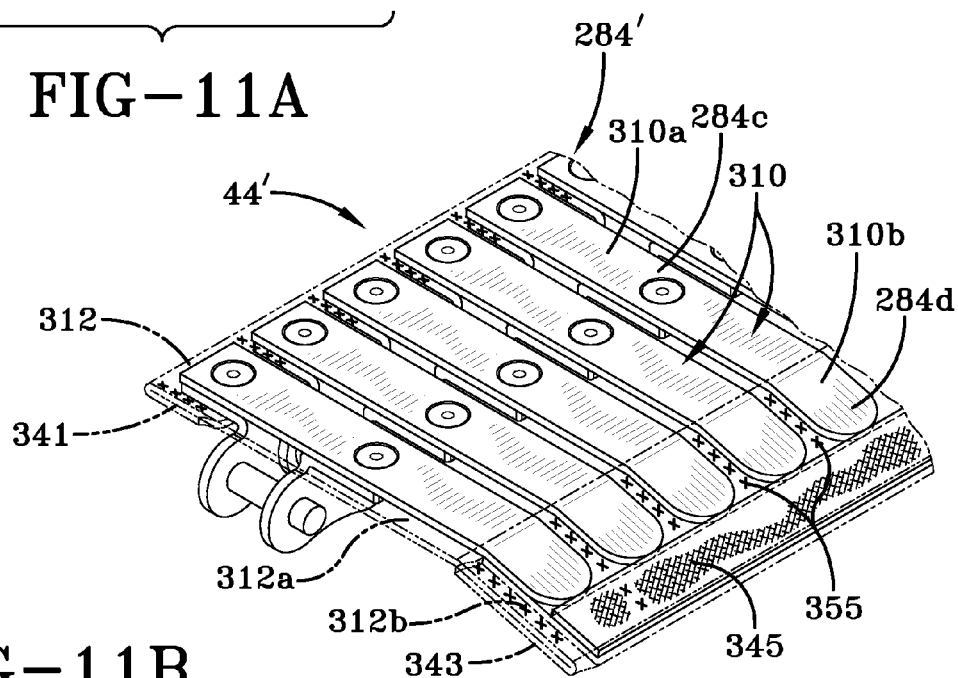
FIG. 11B is a perspective view of an assembled portion of the support structure of FIG. 11A.
Figure 11C:
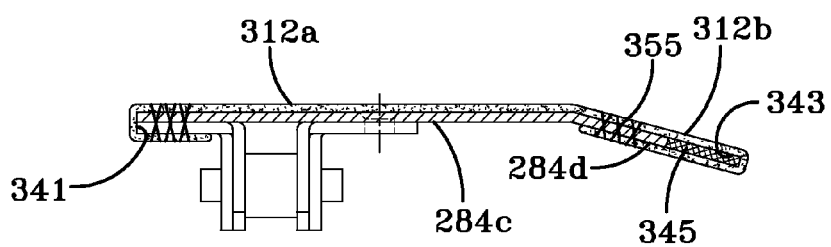
FIG. 11C is an end view of the assembled portion of the support structure of FIG. 11B.

Referring now in particular to FIGS. 11A-11C, 12A, and 12B, another embodiment of a support structure 44' is illustrated, which includes a plurality of leaf elements 310 and a plurality of fabric elements 312 (one shown in FIG. 11B) spanning across several of the leaf elements 310 along the width of the drum 20. The leaf elements 310 and fabric elements 312 jointly define a plurality of leaf assemblies 284' of the support structure 44'. FIGS. 11B and 11C illustrate an exemplary leaf assembly 284', although it is understood that one or more of the features of that leaf assembly 284' may also be applicable to the leaf assemblies 284 of the previously described embodiment. For ease of understanding, like reference numerals across the figures refer to similar features. Particularly referring to FIG. 11B, the exemplary leaf assembly 284' includes a single fabric element 312 having a pair oppositely located pockets 341, 343, as well as an elastic strip 345 located adjacent the pocket 343. Each of the pockets 341, 343 wraps around respective longitudinal ends of leaf elements 310 and is secured in place by a plurality of stitching lines 355 extending through those pockets 341, 343.

Figure 12B:
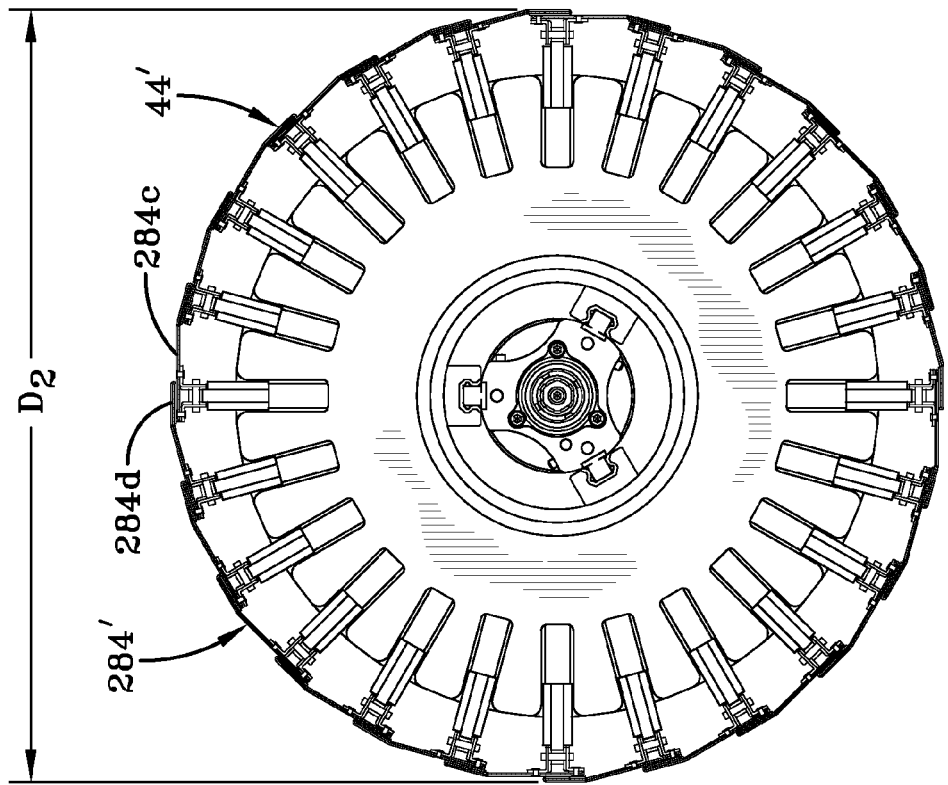
FIG. 12B is a view similar to FIG. 12A showing the drum thereof in a radially expanded condition.
Figure 12A:
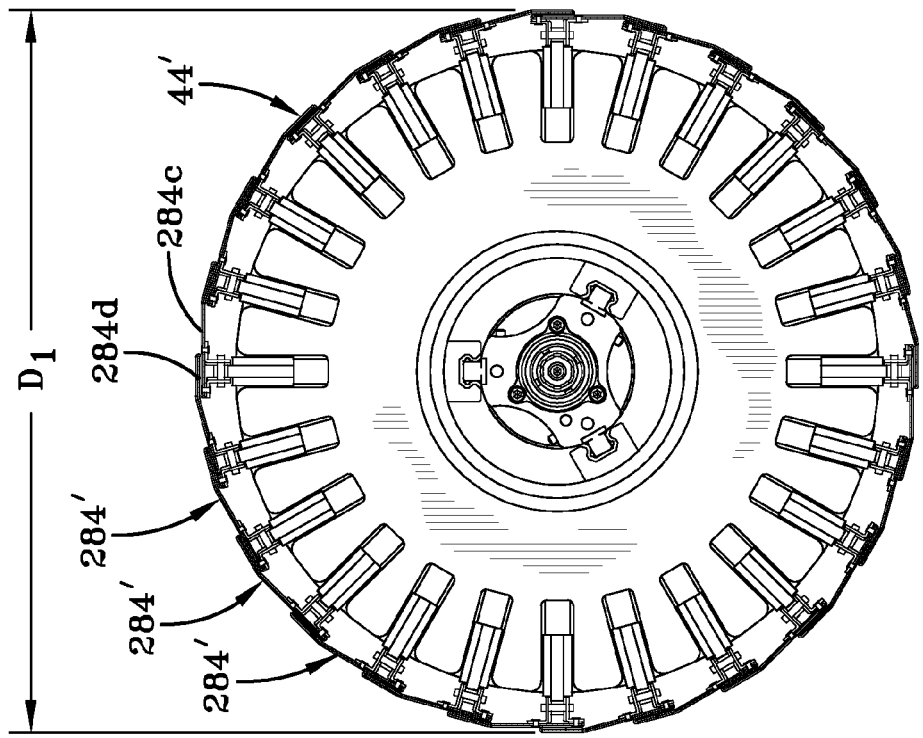
FIG. 12A is an end view of the drum of FIG. 3, illustrating a support structure in accordance with another embodiment of the invention.

Each leaf assembly 284' has a first generally flat portion 284c and a radially inwardly bent portion 284d. More specifically, each of the leaf elements 310 has a generally flat portion 310a and a radially inwardly bent portion 310b. Similarly, each fabric element 312 has a generally flat portion 312a and a radially inwardly bent portion 312b. In this embodiment, all of the leaf assemblies 284' are arranged circumferentially such that each bent portion 284d overlaps the generally flat portion 284c of a circumferentially adjacent leaf assembly 284'. As illustrated in FIGS. 12A and 12B, the bent portions 284d are configured to generally conform to the circular profile of the drum 20, and facilitate maintaining contact between adjacent leaf assemblies 284', as shown in those figures. Notably, the cascade-type arrangement of the leaf assemblies 284' results in a continuous supporting surface of support structure 44' in the circumferential direction, even during crowning, as the drum 20 increases in diameter from a first diameter $D_1$ to a second diameter $D_2$. More specifically, as the diameter of the drum 20 increases from the first diameter $D_1$ to the second diameter $D_2$, adjacent leaf assemblies 284' slide circumferentially relative to one another, thus allowing for expansion in the circumference of drum 20.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for forming a tire, comprising:
applying at least one carcass layer onto a drum rotatable about an axis of rotation to thereby form a cylindrically-shaped unvulcanized tire carcass having opposed first and second lateral ends;
positioning a first bead-and-apex assembly proximate the first lateral end of the unvulcanized tire carcass;
positioning a second bead-and-apex assembly proximate the second lateral end of the unvulcanized tire carcass;
turning-up the first lateral end of the unvulcanized tire carcass around the first bead-and-apex assembly;
turning-up the second lateral end of the unvulcanized tire carcass around the second bead-and-apex assembly; and
while turning-up the first and second lateral ends of the unvulcanized tire carcass around the first and second bead-and-apex assemblies, respectively, rotating a first disk having a plurality of radially moveable lifters and a second disk having a spiral groove engaged with cam followers on the radially moveable lifters relative to each other about the axis of rotation such that, during the relative rotation, the radially moveable lifters move a portion of the drum radially outward relative to the axis of rotation, whereby a portion of the tire carcass between the first and second bead-and-apex assemblies moves radially outward relative to the axis of rotation on a drum support surface comprising a chain link assembly comprising a plurality of connected links held in tension radially outward of the radially moveable lifters.

2. The method of claim 1, further comprising:
maintaining a generally constant orientation of the first and second bead-and-apex assemblies during turning-up of the first and second lateral ends of the unvulcanized tire carcass around the first and second bead-and-apex assemblies, respectively, and during radially outward movement of the portion of the tire carcass between the first and second bead-and-apex assemblies.

3. The method of claim 1, further comprising:
controlling a common mechanism to actuate the turn-up of the first and second lateral ends around the first and second bead-and-apex assemblies, respectively, and to move the portion of the tire carcass between the first and second bead-and-apex assemblies radially outward relative to the axis of rotation.

4. The method of claim 1, further comprising:
while moving the portion of the tire carcass between the first and second bead-and-apex assemblies radially outward relative to the axis of rotation, maintaining a contacting relationship between the drum and substantially the entire inner circumference of the unvulcanized tire carcass.

5. The method of claim 4, further comprising:
while moving the portion of the tire carcass between the first and second bead-and-apex assemblies radially outward relative to the axis of rotation, contacting the substantial entirety of the inner circumference of the unvulcanized tire carcass with a plurality of overlapping segments of the drum movable relative to one another.

6. The method of claim 5, further comprising:
circumferentially sliding the plurality of overlapping segments relative to one another as the diameter of the unvulcanized tire carcass increases with movement of the portion thereof between the first and second bead-and-apex assemblies radially outward relative to the axis of rotation.

7. The method of claim 1, further comprising:
while moving the portion of the tire carcass between the first and second bead-and-apex assemblies radially outward relative to the axis of rotation, stitching the first lateral end to another portion of the unvulcanized tire carcass.

8. The method of claim 1, further comprising:
axially moving the first and second bead-and-apex assemblies inward prior to turning-up the first and second lateral ends of the unvulcanized tire carcass.

9. The method of claim 8, further comprising:
engaging first and second side portions of the unvulcanized tire carcass with the first and second bead-and-apex assemblies respectively prior to turning-up the first and second lateral ends of the unvulcanized tire carcass.

10. The method of claim 1, wherein the tire carcass has a ply cord extending parallel to the axis of rotation and having a length, the method further comprising:
maintaining the length of the ply cord substantially constant during turning-up of the first and second lateral ends of the unvulcanized tire carcass around the first and second bead-and-apex assemblies, respectively, and during radially outward movement of the portion of the tire carcass between the first and second bead-and-apex assemblies.

11. A method for forming a tire, comprising:
applying at least one carcass layer onto a drum rotatable about an axis of rotation to thereby form a cylindrically-shaped unvulcanized tire carcass having opposed first and second lateral ends;
positioning a first bead-and-apex assembly proximate the first lateral end of the unvulcanized tire carcass;
positioning a second bead-and-apex assembly proximate the second lateral end of the unvulcanized tire carcass;
turning-up the first lateral end of the unvulcanized tire carcass around the first bead-and-apex assembly;
turning-up the second lateral end of the unvulcanized tire carcass around the second bead-and-apex assembly;
while turning-up the first and second lateral ends of the unvulcanized tire carcass around the first and second bead-and-apex assemblies, respectively, rotating a first disk having a plurality of radially moveable lifters and a second disk having a spiral groove engaged with cam followers on the radially moveable lifters relative to each other about the axis of rotation, such that, during the relative rotation, the radially moveable lifters move a portion of the drum radially outward relative to the axis of rotation, whereby a portion of the tire carcass between the first and second bead-and-apex assemblies moves radially outward relative to the axis of rotation on a drum support surface comprising a chain link assembly comprising a plurality of connected links held in tension radially outward of the radially moveable lifters;
maintaining a generally constant orientation of the first and second bead-and-apex assemblies during turning-up of the first and second lateral ends of the unvulcanized tire carcass around the first and second bead-and-apex assemblies, respectively, and during radially outward movement of the portion of the tire carcass between the first and second bead-and-apex assemblies; and
circumferentially sliding a plurality of overlapping segments of the drum relative to one another as the diameter of the unvulcanized tire carcass increases with movement of the portion thereof between the first and second bead-and-apex assemblies radially outward relative to the axis of rotation.

12. The method of claim 11, wherein the tire carcass has a ply cord extending parallel to the axis of rotation and having a length, the method further comprising:
maintaining the length of the ply cord substantially constant during turning-up of the first and second lateral ends of the unvulcanized tire carcass around the first and second bead-and-apex assemblies, respectively, and during radially outward movement of the portion of the tire carcass between the first and second bead-and-apex assemblies.

* * * * *